United States Patent [19]

Wurgler

[11] Patent Number: 5,419,427
[45] Date of Patent: May 30, 1995

[54] FINGER CHUCK ASSEMBLY AND METHOD FOR PROCESSING A HOLLOW ARTICLE

[75] Inventor: Winston A. Wurgler, Strongsville, Ohio

[73] Assignee: Feco Engineered Systems, Inc., Cleveland, Ohio

[21] Appl. No.: 184,264

[22] Filed: Jan. 21, 1994

[51] Int. Cl.⁶ ........................ B65G 47/90; B66C 1/54
[52] U.S. Cl. .......................... 198/803.7; 198/803.12; 294/95; 294/902
[58] Field of Search ..................... 294/88, 90, 93-97, 294/99.1, 115, 116, 902; 118/503; 198/803.7, 803.12, 377, 378; 279/2.03, 2.1, 2.11, 2.21, 2.24

[56] References Cited

U.S. PATENT DOCUMENTS

| | | |
|---|---|---|
| 1,944,255 | 1/1934 | McFall et al. |
| 2,882,061 | 4/1959 | Johnson |
| 3,075,800 | 1/1963 | Rowekamp ............... 294/95 X |
| 3,314,714 | 4/1967 | Brubaker ................... 294/93 |
| 3,545,803 | 12/1970 | Ruscitti |
| 3,944,058 | 3/1976 | Strauss |
| 3,945,486 | 3/1976 | Cooper |
| 4,032,185 | 6/1977 | Peyton |
| 4,086,999 | 5/1978 | McDonald |
| 4,154,350 | 5/1979 | Frohn ........................ 294/95 X |
| 4,199,183 | 4/1980 | Hecker ...................... 294/97 |
| 4,291,910 | 9/1981 | Maupate |
| 4,304,398 | 12/1981 | Crowell |
| 4,340,249 | 7/1982 | Bucklew |
| 4,441,955 | 4/1984 | Richardson et al. |
| 4,540,211 | 9/1985 | Masserang ................. 294/97 X |
| 4,572,355 | 2/1986 | Hunter |
| 4,576,407 | 3/1986 | Lambert ...................... 294/97 |
| 4,890,726 | 1/1990 | Hissmann |
| 4,927,205 | 5/1990 | Bowler et al. |

FOREIGN PATENT DOCUMENTS

| | | |
|---|---|---|
| 503867 | 9/1979 | Australia . |
| 1188167 | 9/1959 | France ........................ 294/97 |
| 2241476 | 6/1974 | France . |
| 2556330 | 6/1985 | France ........................ 294/95 |
| 158741 | 9/1984 | Japan . |
| 8505346 | 12/1985 | WIPO . |

Primary Examiner—Johnny D. Cherry
Attorney, Agent, or Firm—Renner, Otto, Boisselle & Sklar

[57] ABSTRACT

A finger chuck assembly and method for holding a bottle or other hollow article having a neck opening at one end, characterized by a support member having an axis; a plurality of jaws each including a finger, an actuator arm and an intermediate portion interconnecting the finger and actuator arm; and a chuck operator member carried on the support member for movement relative to the support member. The jaws each are pivotally mounted at the intermediate portion to the support member for movement of the jaw between a contracted position for inserting the fingers into a neck opening of a hollow article and an expanded position for engaging an interior surface of the hollow article. The fingers of the jaws extend generally parallel to one another and to the axis of the support member when the jaws are in the contracted positions thereof and diverge laterally outwardly away from one another when the jaws are in the expanded positions thereof. The chuck operator operatively engages the actuator arms of the jaws for effecting movement of the jaws between the expanded and contracted positions in response to movement of the chuck operator relative to the support member. Other forms of chucks are also disclosed.

25 Claims, 5 Drawing Sheets

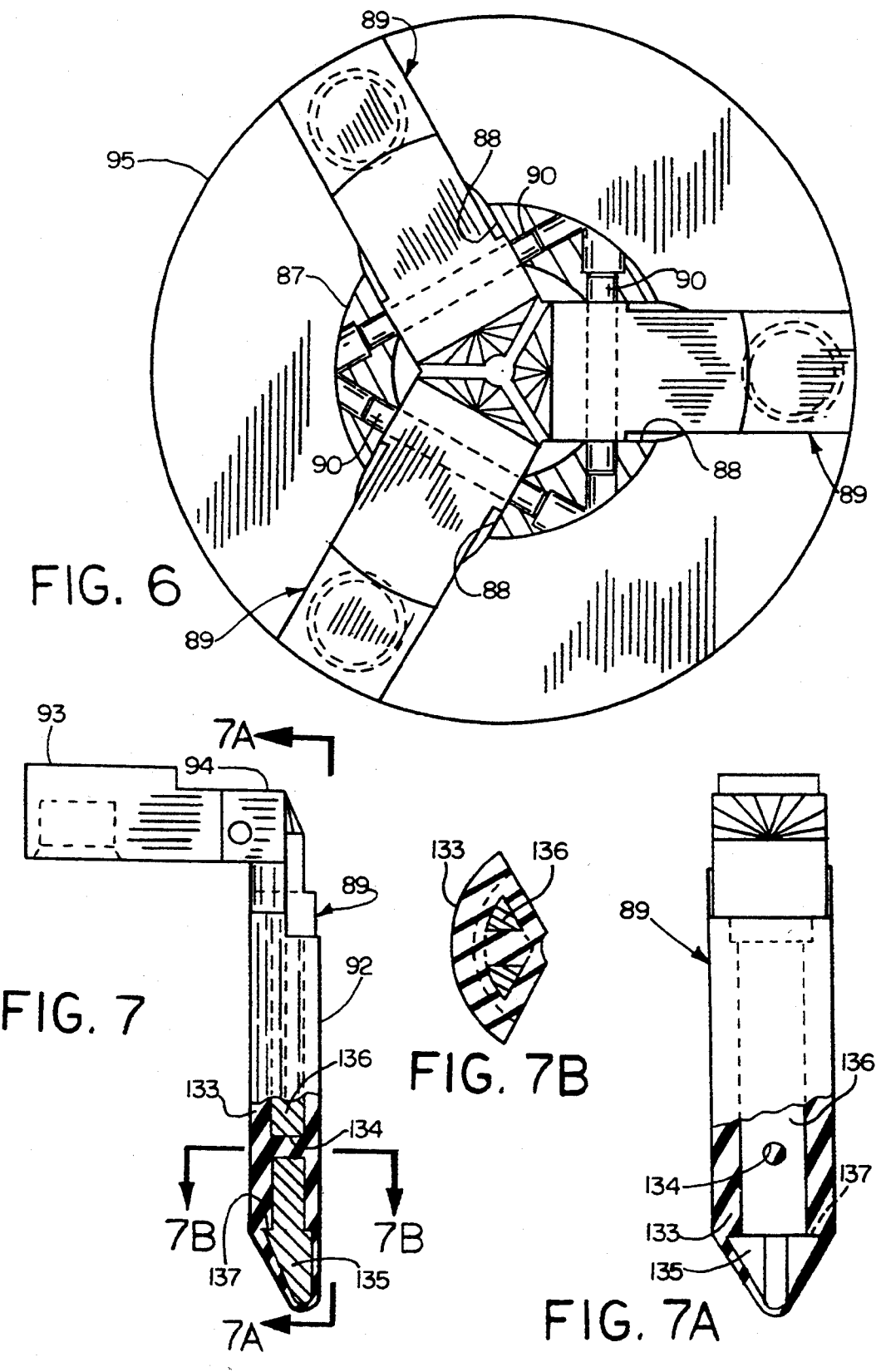

FINGER CHUCK ASSEMBLY AND METHOD FOR PROCESSING A HOLLOW ARTICLE

The invention hereindescribed generally relates to systems for handling articles and for moving them through various operational steps in an efficient and controlled manner. More particularly, the invention is directed to holding devices and methods for carrying articles having an open end such as bottles. The holding device is particularly suited for coating operations such as where a glass bottle is provided with a coating to obtain a desired decorative finish, strength and/or other desirable characteristics.

BACKGROUND OF THE INVENTION

Prior art conveyor systems for carrying open-ended hollow articles such as bottles from an input station through one or more processing stations to an output station have employed a variety of holding devices. Typically, a plurality of holding devices are carried and guided along a path through the various stations by a chain conveyor. At the input and output stations, provision is made for engaging and disengaging the articles with respect to the holding devices.

For many processes it is necessary for the holding device to internally engage the hollow article. Holding devices designed to internally engage a hollow article are herein referred to as internal holding devices. Prior art internal holding devices have employed chucks including a plurality of jaws or fingers that may be radially contracted to permit insertion of the jaws through an open end of the hollow article. Once inserted, the jaws are expanded radially to engage the interior of the article. When expanded, the jaws mechanically and/or frictionally engage the interior surface of the article to hold the article to the holding device.

Notwithstanding the variety of holding devices known in the prior art, the demands of present and future manufacturing processes demand or will demand new and improved holding devices that overcome one or more problems that arise when using previously known holding devices. One present day manufacturing process requires, for example/an internal holding device that preferably can accommodate a relatively wide range of sizes and configurations of open neck bottles, including bottles having relatively small diameter neck openings. Many internal holding devices in the prior art have been found to be unsuitable because of limitations arising from their use of a pin-cam for urging the jaws radially outwardly. Internal holding devices of this type are described in U.S. Pat. Nos. 2,882,061, 3,545,803, 4,086,999, 4,291,910 and 4,572,355. Conventional pin-cam chuck mechanisms have not been found to be satisfactory for accommodating a wide range of neck opening sizes and configurations including relatively small diameter neck openings on the order of ½", coupled with adequate strength and holding characteristics especially in high temperature environments as may be found in processes where the containers are passed through ovens maintained at elevated temperatures. Many internal holding devices that have been previously proposed have parts inside the container that could become loose and fall off into the bottle.

SUMMARY OF THE INVENTION

The present invention provides an article holding device and method characterized by use of a novel finger chuck assembly for holding a bottle or other hollow article having an opening at one end. The unique construction of the assembly lends itself to accommodating a wide range of sizes and configurations, while providing adequate strength and holding characteristics even at elevated temperatures. The invention also provides an arrangement that does not require the use of parts inside the hollow article that might fall off within the hollow article.

According to one aspect of the invention, a finger chuck assembly comprises a support member having an axis; a plurality of jaws each including a gripping finger, an actuator arm and an intermediate portion interconnecting the gripping finger and actuator arm; and a chuck operator member carried on the support member for movement relative to the support member. Each jaw is mounted at the intermediate portion thereof to the support member for pivotal movement of the gripping finger thereof between a contracted position for insertion into a neck opening of a hollow article and an expanded position for engagement within an interior surface of the hollow article either directly or through use of a friction element carried on the gripping finger. The gripping fingers of the jaws extend generally parallel to one another and to the axis of the support member when in their contracted positions, and they diverge laterally or radially outwardly away from one another when in their expanded positions. The chuck operator operatively engages the actuator arms of the jaws for effecting movement of the jaws and corresponding movement of the gripping fingers between their expanded and contracted positions in response to movement of the chuck operator relative to the support member.

In a preferred embodiment, each gripping finger is generally L-shape with the finger and actuator arm forming respective legs of the L. The chuck operator member includes a pusher plate mounted on the support member for relative movement parallel to the axis of the chuck assembly, and the pusher plate has a pusher surface for engaging the actuator arms of the jaws. Each actuator arm has a bearing surface spaced from the pivot axis of the corresponding jaw. The bearing surface slidably engages the pusher surface such that movement of the pusher plate effects movement of the actuator arms for expanding and/or contracting the gripping fingers. Preferably, the chuck operator member includes bias means for causing the actuator arms of the jaws to be biased against the pusher surface of the pusher plate, normally for biasing the gripping fingers toward their expanded positions.

Further in accordance with a preferred embodiment, the support member includes a cap from which the gripping fingers of the jaws project. The cap is disposed for engagement by the open neck end of the hollow article thereby to limit the extent of insertion of the gripping fingers into the hollow article. Preferably, the cap includes means cooperative with the jaws for laterally stabilizing the hollow article when the hollow article is internally engaged by the gripping fingers of the jaws. The bias means includes springs interposed between the cap and actuator arms of the jaws, and the springs are compressible to permit ready removal thereof from between the cap and actuator arms for interchange with springs having different spring constants. Also provided is a stop fixed with respect to the support member for limiting movement of the pusher plate in a first direction, while the bias means is operative to cause the actuator arms to bias the pusher plate against the stop.

As is preferred, the fingers have on laterally outer sides thereof friction material for contacting the interior surface of the hollow article. The friction material may be integral with the fingers or in the form of pads or covers bonded and/or mechanically joined to the fingers, as by molding the pad of friction material to the fingers or fastener-securing friction pads to the fingers. By way of further example, a friction pad on each finger may include friction material fixed to a base that is removably attached to the finger, whereby the friction pad may be easily replaced when worn or interchanged with friction pads having different thicknesses for different sizes of hollow articles. In effect, the friction material, if not integral with the fingers, becomes a part of the fingers for effecting engagement with an interior surface of an article when the gripping fingers are expanded.

Still in accordance with a preferred embodiment, the support member has a mounting end and a jaw end, and the jaws are connected preferably by pivot pins or equivalent means to the jaw end of the support member. Preferably, three jaws are circumferentially equally spaced around the axis. The support member may include a pin having a head portion and a shank portion, with the intermediate portions of the jaws being pivotally connected to the head portion.

The aforesaid cap preferably includes a receptacle and a replaceable insert housed in the receptacle. The replaceable insert preferably includes the aforesaid means for laterally stabilizing the article when gripped by the gripping fingers, so that the replaceable insert may be replaced by other inserts configured for use with hollow articles having different neck end configurations. The means for laterally stabilizing may include a planar abutment surface or a socket in the cap (insert) for receiving the open neck end of the hollow article with a close lateral fit.

As is preferred, the jaws have guide ramp surfaces at distal ends thereof for guiding the distal ends thereof into the neck opening of the hollow article. The guide ramp surfaces at the distal ends of the fingers collectively form a generally conical guide surface when the gripping fingers are in their contracted positions.

According to another aspect of the invention, a chuck for holding a hollow article having a neck opening comprises a support member having a mounting end, a nose end, and an intermediate portion interconnecting the mounting and nose ends; a flexible sleeve surrounding the intermediate portion of the support member; and an operator member carried on the support member for movement relative to the support member, the operator member and nose end having axially opposed surfaces respectively for engaging opposite axial ends of the sleeve. The sleeve has an axial length such that movement of the opposed surfaces towards one another causes the elastomeric sleeve to bellow out for engaging an interior surface of the hollow article. The flexible sleeve may be in the form of an elastomeric tubular sleeve or it may be composed of a circumferential array of flexible strap elements, the latter preferably having friction material at intermediate portions thereof for positive gripping of the hollow article.

The invention also provides a novel way for releasably retaining an article holding device in an elevated position. A spring retainer is provided for this purpose, the spring retainer being U-shape with flexible legs configured for engaging a groove or other axial undercut in the holding device.

The foregoing and other features of the invention are hereinafter fully described and particularly pointed out in the claims, the following description and the annexed drawings setting forth in detail certain illustrative embodiments of the invention, these being indicative, however of but a few of the various ways in which the principles of the invention may be employed.

BRIEF DESCRIPTION OF THE DRAWINGS

FIG. 6 is a sectional view of the finger chuck assembly taken substantially along the line 6—6 of FIG. 1.

FIG. 7 is an elevational view, partly broken away in section, of a representative one of the jaws of the finger chuck assembly.

FIG. 7A is an elevational view of the jaw of FIG. 7 looking from the line 7A—7A of FIG. 7.

FIG. 7B is a sectional view of the jaw of FIG. 7 taken along the line 7B—7B of FIG. 7.

DETAILED DESCRIPTION

Figure 1:
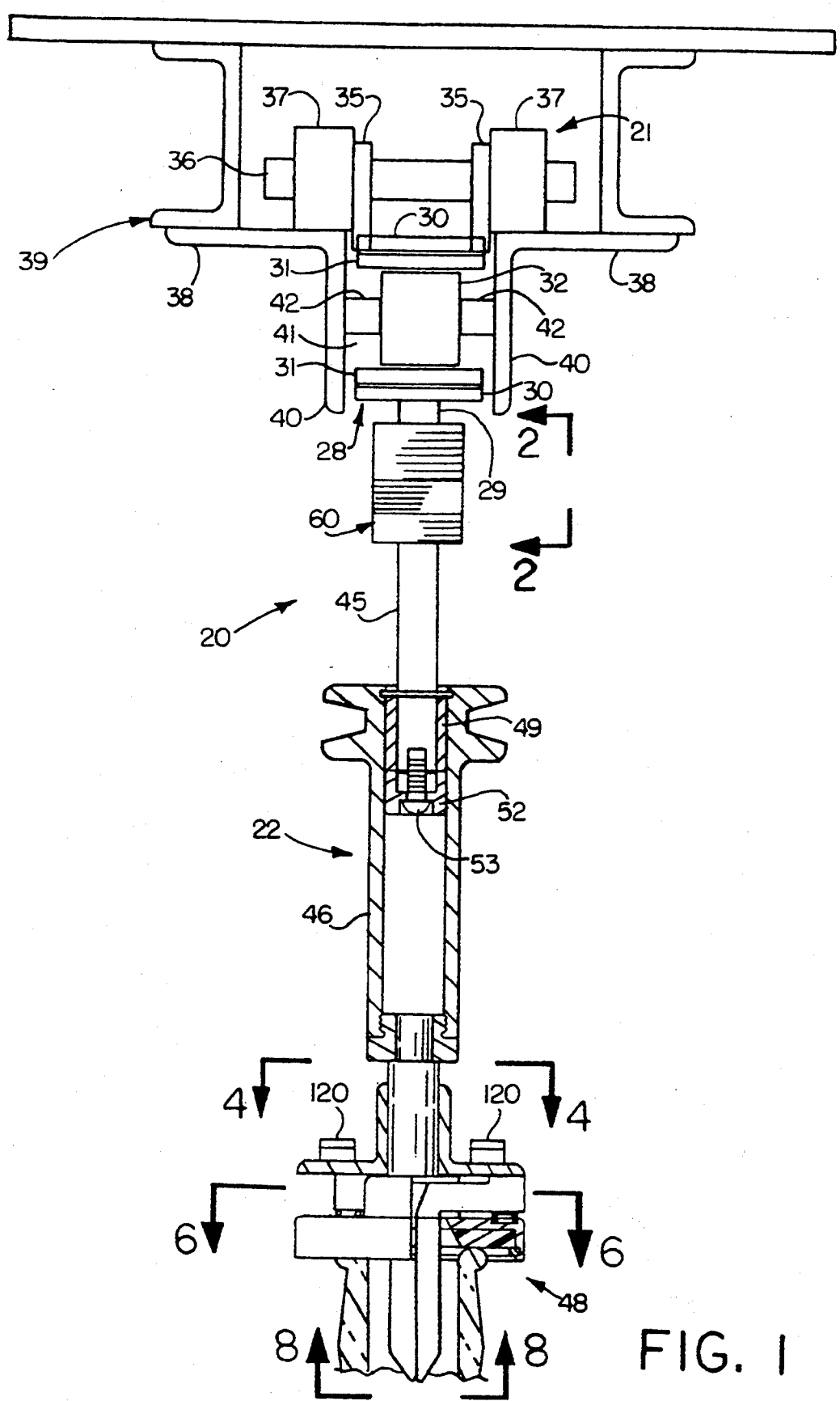
FIG. 1 is an elevational view of a segment of a carrier conveyor looking along the movement path thereof and showing, partly in section, an article holding device according to the invention.

Referring initially to FIG. 1, a carrier conveyor incorporating the invention is indicated generally by reference numeral 20. The carrier conveyor 20 comprises an endless conveyor chain 21 to which holding devices 22 (one being illustrated) are attached and preferably located on precise centers. The holding device 22 is operative to engage and hold a hollow article such as, for example, a bottle, for transfer by the conveyor chain to and through one or more processing stations. By way of specific example, a bottle may be loaded onto the holding device at a loading station for transfer to and through a bottle coating station where a coating is applied to the exterior surface of the bottle. The bottle may then be transferred to and through an oven for curing the coating after which the bottle may be advanced to an unloading station where it is unloaded from the holding device.

The illustrated preferred embodiment of a holding device 22 according to the invention is hereinafter described in detail in the context of its use for engaging and holding bottles, as same was conceived and developed for such use. However, those skilled in the art will well appreciate that the invention may be used or may be adapted to be used with other types of hollow articles for enabling handling of such articles in a variety of industrial or other processes. Also, references to vertical and horizontal, top and bottom, upper and lower, etc., are used for convenience in description and not by way of limiting the system and apparatus described herein to a specific orientation inasmuch as the orientation may be varied for different applications.

As shown in FIG. 1, the chain conveyor 21 includes a roller chain 28 comprising, in repetition, a link pin 29 connecting outer links 30 to inner links 31 for articulated movement. Mounted for rotation on the pin 29 between the inner links 31 is a roller 32.

In the illustrated embodiment, the chain conveyor 21 and holding device or devices 22 are oriented to hold bottles in vertical position during horizontal translating movement thereof along the path of the chain conveyor. More particularly, the link pins 29 of the roller chain 28 are oriented vertically for relative pivoting movement of the links 30 and 31 about vertical axes.

At spaced intervals along the length of the chain conveyor 21, the upper one of paired outer links 30 is provided with upright legs 35 through which an axle 36 passes. Mounted to the ends of the axle 36 outwardly of the legs 35 are respective carrier rollers 37 which ride on respective runner rails 38 of a fabricated conveyor track assembly 39. The runner rails 38 include respective depending flanges 40 in spaced apart parallel relationship. The flanges 40 define therebetween a channel 41 through which the roller chain 28 moves. Transverse alignment of the roller chain is maintained by guide blocks 42 attached to the depending flanges 40 of the runner rails. The guide blocks 42 project inwardly and define therebetween a containment space for guided passage therebetween of the link pin rollers 32. At each mounting location for a holding device 22, the roller chain 28 has a depending attachment pin 45, which pin 45 may be an integral extension of a link pin 29.

The holding device 22 generally includes a spindle 46 mounted for rotation and telescoping axial movement on the attachment pin 45 and a finger chuck assembly 48 attached to the spindle. The spindle 46 has a tubular body concentric with and rotatably mounted on the attachment pin 45 by a cylindrical bushing 49. The bushing also provides for telescoping sliding movement of the spindle on the attachment pin. The spindle is prevented from falling off the attachment pin by engagement of the bushing against an end stop in the form of a cap 52 secured to the end of the attachment pin 45 by a fastener 53 or other suitable means. In this manner the end stop cooperates with the bushing to define a lowermost position of the spindle that is shown in FIG. 1.

Figure 2:
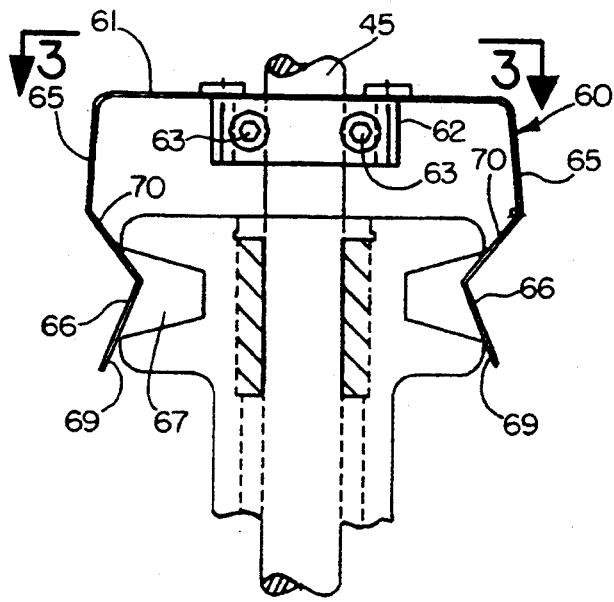
FIG. 2 is a fragmentary elevational view of the article holding device looking from the line 2—2 of FIG. 1.
Figure 3:
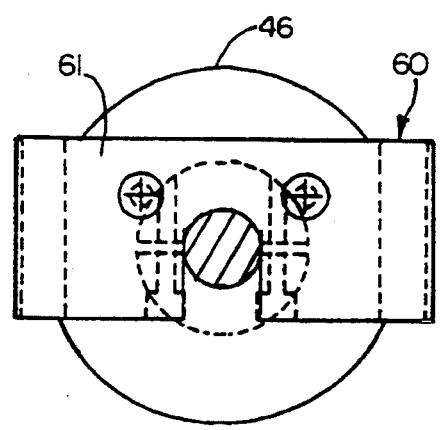
FIG. 3 is a sectional view of the article holding device taken along the line 3—3 of FIG. 2.

Provision also is made for retaining the spindle 46 in an upper elevated position, as when the holding device 22 is not being used. To this end there is provided a spring retainer 60. With additional reference to FIGS. 2 and 3, the spring retainer 60 preferably is formed from flat spring steel and has a U-shape. The base 61 of the retainer has a central opening for passage of the attachment pin 45 therethrough, and the spring retainer is attached to the attachment pin by a split collar 62 and associated fasteners 63 for securing the collar tightly around the attachment pin to prevent movement of the spring retainer along the pin.

The depending legs 65 of the spring retainer 60 have the lower ends thereof bent to form generally V-shape latching elements 66. The latching elements are intended to engage in an annular groove 67 provided in the upper portion of the spindle 46 when the spindle is raised to its elevated or upper position shown in FIG. 2. The inherent resiliency of the spring retainer functions to resiliently retain the latching elements 66 in the spindle groove 67 with sufficient force to retain the spindle in its elevated position.

The upper and lower arm portions of the V-shape latching elements 66 are preferably inclined to the axis of the attachment pin. Accordingly, the lower arm portion of the latching elements will present an inclined ramp surface 69 to the spindle being raised thereagainst whereupon the legs of the spring retainer will be cammed away from one another to receive therebetween the upper end portion of the spindle containing the spindle groove. Conversely, the uppermost arm of the latching elements presents an inclined ramp surface 70 which functions to cam the legs of the spring retainer apart when the spindle is moved downwardly to its lower or operative position.

The spindle groove 67 has a function in addition to that of providing a convenient means for the spindle to be engaged by the latching elements 66 of the spring retainer 60. This other function is to provide for rotating the spindle relative to the attachment pin 45. In the illustrated embodiment, the spindle groove, which is concentric with the rotational axis of the spindle, is configured to engage a belt provided at the locations where it is desired to rotate the spindle in order to rotate a bottle or other article held to the spindle by the finger chuck assembly 48. The belt may extend along the path of the holding device such that horizontal translating movement of the holding device relative to the belt effects rotation of the spindle. Additionally or alternatively, the belt may be driven to rotate the spindle at a speed independently of the speed of the conveyor chain 28 (FIG. 1). Of course, other means may be provided to rotate the spindle. By way of further example, the spindle may be equipped with a sprocket for engaging a chain in a manner similar to that just described above with respect to the spindle groove and belt. Accordingly, various means may be employed to rotate the spindle within the broad scope of the present invention.

Figure 4:
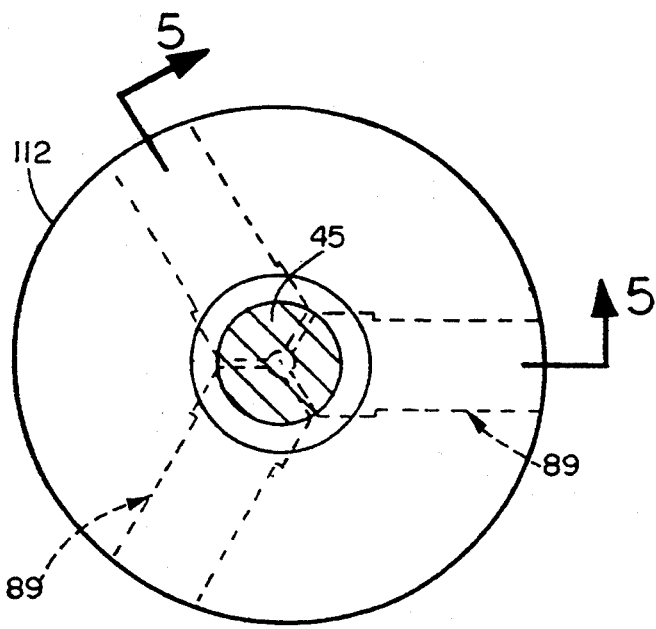
FIG. 4 is a sectional view of the article holding device taken along the line 4—4 of FIG. 1 and showing in top plan view a finger chuck assembly forming a part of the article holding device.
Figure 5:
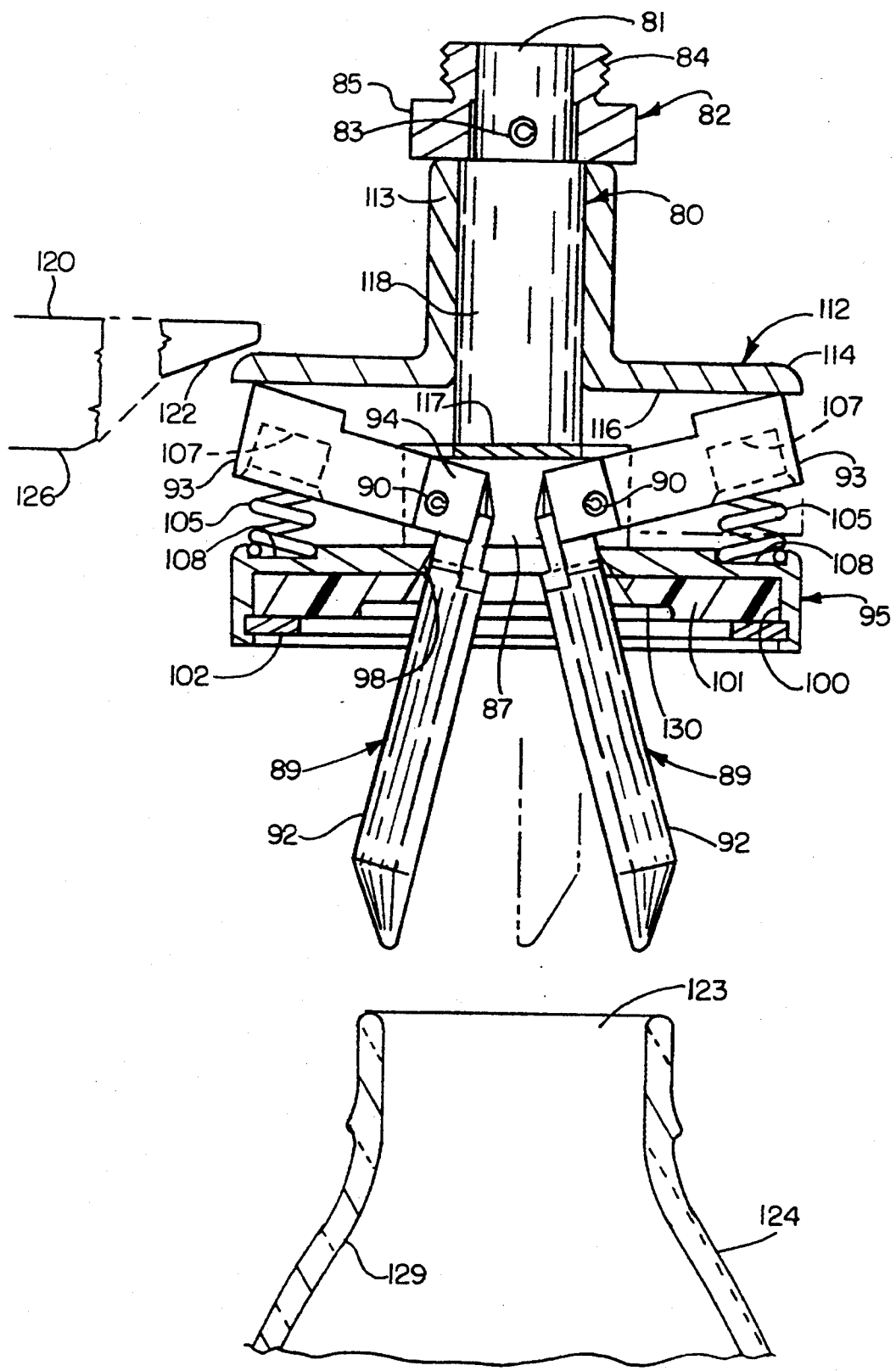
FIG. 5 is sectional view of the finger chuck assembly taken substantially along the line 5—5 of FIG. 4.

Referring now to FIGS. 4–6, the finger chuck assembly 48 comprises a support pin 80 that has a reduced diameter neck portion 81 to which a plug 82 is fixed by a roll pin 83. The plug 82 has an externally threaded upper end portion 84 for screwing into the internally threaded lower end portion of the spindle 46 as shown in FIG. 1. The plug 82 also has a lower wrench head portion 85 for engagement by a wrench or other suitable tool that may be used to turn the plug 82 for tightening purposes. In this manner, the finger chuck assembly may be removably attached to the spindle for rotation and axial movement therewith relative to the attachment pin 45, as well as translating movement of the spindle along with the attachment pin as it is carried by the conveyor chain through one or more processing stations. Of course, other suitable means may be employed to removably secure the finger chuck assembly to the spindle 46 or, more generally, to the attachment pin 45 and/or conveyor chain 22. By way of further example, the support pin 80 may be formed with the spindle 46 as a single piece, in which case it is preferable to provide for convenient removal of the spindle from the attachment pin 45 whereby different spindles and finger chuck assemblies may be interchanged with other spindle and finger chuck assemblies for use with, for example, different sizes or types of bottles., containers or other hollow articles. However, as illustrated, preferably the finger chuck assembly is readily removable from the spindle 46, whereby only the finger chuck assemblies need be interchanged with other finger chuck assemblies to adapt the overall conveyor system for use with different sizes and types of containers or other hollow articles.

The support pin 80 has at its lower end a larger diameter end or head portion 87 that has formed in its underside plural radially extending slots 88. The slots 88 are sized to closely receive respective finger jaws 89 that are connected to the end portion 87 by respective pins 90 for pivotal movement. In the illustrated embodiment, three such slots 88 and finger jaws 89 are provided as is preferred. However, the number thereof may be varied as desired. For some applications, two diametrically opposed finger jaws may be quite adequate. The illustrated three finger jaw arrangement, however, provides additional stability of a bottle or other hollow article held thereto.

In the illustrated preferred embodiment, the jaws 89 are identical. Each jaw is generally L-shape with one leg forming a gripping finger 92 and the other leg forming an actuator arm 93. The gripping finger and actuator arm are interconnected by an intermediate portion 94 through which the pivot pin 90 extends.

A cap 95 is attached to the lower end portion 87 of the support pin 80, as by integrally being formed with the support pin. Accordingly, the cap forms a continuation of the support member and may be considered a part of the support member.

As shown in FIG. 5, the cap 95 has a central opening 98 through which the gripping fingers 92 of the jaws 89 pass for projection downwardly beyond the cap 95. The opening 98 is tapered outwardly going from top to bottom to permit full radially outward swinging movement of the gripping fingers to their illustrated solid-line position. At its underside, the cap 95 includes a receptacle 100 for receiving an insert 101 which is held in the receptacle by a snap ring 102 or other suitable means.

The jaws 89 are normally held in their radially expanded position shown in solid lines in FIG. 5 by means of springs 105 that are interposed between the radially outer ends of the actuator arm 93 and the cap 95. In the illustrated embodiment, the spring is in the form of a compression coil spring. One end of the spring is retained in a relatively deep socket 107 provided in the underside of the corresponding actuator arm 93. The other end of the spring is retained in a relatively shallow socket 108 that opens to the top surface of the cap 95. The relatively shallow socket 108 facilitates easy removal and replacement of the spring with other springs that may have different spring constants and/or characteristics, as may be desired to adjust the holding force of the gripping fingers. Because of the shallow socket, a screwdriver may be used to easily lift the end of the spring out of the socket 108 after which the spring can be withdrawn from the relatively deep socket 107 in the actuator arm 93. In reverse manner, a new spring may be inserted first into the relatively deep socket 107 and then popped into the relatively shallow socket 108.

The jaws 89, or more particularly the gripping fingers 92, are moveable from expanded to contracted positions against the spring biasing forces of the springs 105 by a chuck operator 112 made, for example, of case-hardened steel. In the illustrated embodiment, the chuck operator 112 has a central tubular portion 113 carried on the support pin 80 for axial sliding movement and a radially extending flange portion 114 that overlies the ends of the actuator arms 93 of the jaws 89. The flange 114 functions as a pusher plate for engaging the actuator arms at their radially outer ends. Each actuator arm, or more particularly a wear plate thereof if provided, slidably engages the pusher surface 116 on the underside of the pusher plate 114. The springs 105 bias the actuator arms against the pusher plate such that axial movement of the chuck operator 112 operates to rotate the jaws between their expanded and contracted positions respectively shown in solid and broken lines in FIG. 5. Maximum expansion of the gripping fingers 92 may be limited by engagement of the chuck operator against the underside of the plug 82 which functions as a stop. Maximum contraction of the gripping fingers may be limited by engagement of the actuator arms against the top surface of the cap 95 or engagement of the chuck operator against the shoulder 117 formed at the intersection of the lower end portion 87 and intermediate shank portion 118 of the support pin 80.

The chuck operator 112 also functions as a cam follower for engaging a cam surface as the finger chuck assembly 48 is moved laterally along the path of the conveyor 20. To this end, the top surface of the flange or pusher plate 114 may be engaged by a cam or cams 120 disposed in its path. Such a cam is depicted in FIG. 5. As the finger chuck assembly moves from right to left in FIG. 5, the top side of the pusher plate will engage the upper portion of an inclined cam surface 122. As the pusher plate moves along the cam surface, it will be forced downwardly to radially inwardly contract the gripping fingers of the jaws. When sufficiently contracted to fit into a neck opening 123 of a hollow article such as bottle 124 to be held by the finger chuck assembly, the open neck of the article may be telescoped over the contracted gripping fingers. During loading of the bottle onto the finger chuck assembly, the jaws may be held in their contracted positions by the pusher plate (cam follower) riding along the horizontal bottom surface 126 of the cam 120, such relationship further being shown in FIG. 1 after the bottle is telescoped over the gripping fingers. With the bottle 124 telescoped over the contracted fingers, the pusher plate will move to a reversely inclined cam surface (not shown) of the cam 120 and/or clear of the cam to allow the gripping fingers to radially outwardly expand to grip the interior surface of the bottle.

Preferably, the open end of the bottle is urged to abutment with the bottom surface of the insert 101. The geometry of the bottle may be such that the fingers engage a shoulder surface 129 at the lower end of the neck such that the bottle is urged upwardly against the bottom of the insert 101 as the jaws radially outwardly expand to a conical configuration. This produces an axially upward component of holding force that aides in stabilizing the bottle. To further ensure secure holding of the bottle, the insert 101 may be provided with a central hole or recess 130 forming a socket for closely receiving the upper end of the bottle thereby to prevent lateral shifting movement of the upper end of the bottle when engaged and held to the cap 95 by the radially outwardly expanded fingers 92. However, the finger chuck assembly may be used with other configurations of bottles or hollow articles, such as those that may have cylindrical interior surfaces whereupon friction gripping of the interior cylindrical surface is primarily relied upon to hold the hollow article to the finger chuck assembly. The snap ring 102 may be easily removed to permit ready exchange of the insert 101 with other inserts of different shapes, sizes and/or thicknesses for adapting the finger chuck assembly for use with a variety of bottles or other hollow articles.

As shown in FIG. 7, the gripping finger 92 of each jaw preferably has on at least the laterally outer side thereof a friction material 133 for contacting the interior surface of the bottle or other hollow article, although more preferably the finger is covered on all sides by friction material as shown in FIGS. 7, 7A and 7B. The friction material is bonded to the fingers, and it is preferred that the friction material be mechanically locked to the fingers. In the illustrated embodiment, the friction material is a silicone rubber that is molded to the finger. The finger has therein one or more through holes 134 through which the friction material is extruded during the molding process. The finger also has a head 135 which forms with the stem 136 of the finger an undercut or shoulder 137 that further aids in preventing the rubber cover 133 from being pulled off of the finger.

Figure 8:
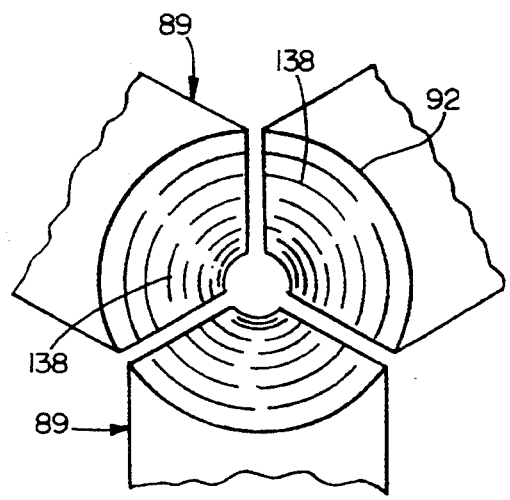
FIG. 8 is an end view of the finger chuck assembly looking from the line 8—8 of FIG. 1.

As is preferred for use with glass bottles and the like, the jaws 89 are made of stainless steel or similar material while the rubber cover reduces or prevents scratching of the interior surface of the bottle. Also, as shown in FIG. 8, the tapered leading ends 138 of the fingers when collapsed preferably collectively form respective segments of a conical pilot surface for guiding telescopic insertion of the fingers into the open end of a bottle or other hollow article.

As above indicated, the finger chuck assembly may be removed from the spindle for replacement when worn or with another size finger chuck assembly that can accommodate different sizes and/or configurations of bottles or other hollow articles. According to the invention, different sizes and configurations of bottles and other articles may be otherwise accommodated. For example, a removable sleeve of friction material such as silicone rubber may be slipped over each jaw finger to correspondingly increase the maximum diameter or width of opening in the article that may be engaged and held to the chuck assembly. The sleeve may be provided with a tight fit or otherwise secured to prevent it from slipping off of the finger when in use.

Figure 9:
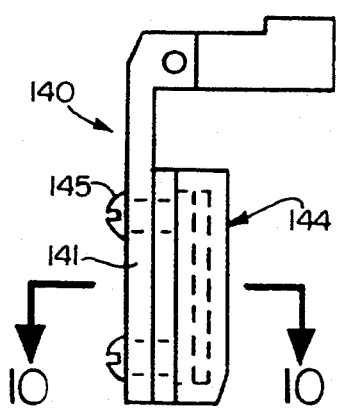
FIG. 9 is an elevational view of another form of jaw that may be used in the finger chuck assembly.
Figure 10:
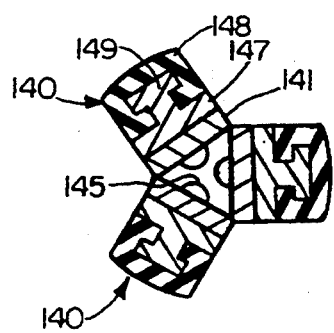
FIG. 10 is a sectional view of a finger chuck assembly employing three jaws like the jaw of FIG. 9 and taken along the line 10—10 of FIG. 9.

In FIGS. 9 and 10, a modified form of jaw is shown generally at 140. The jaw 140 is substantially the same as the above described jaw, except that the finger 1 41 is preferably generally in the form of a flat bar that facilitates securement of a friction pad member 144 to the finger by fasteners 145 or other suitable means. The friction pad, however, can be easily removed and replaced with a different pad when worn or when a different thickness or different friction material may be desired for the article to be held by the chuck assembly. For example, a thicker or thinner friction pad member may be used to grip wider or smaller mouth bottles or other articles, respectively.

The friction pad member 144 includes a base member 147 to which friction material 148 such as silicone rubber is secured. The base member is made of a suitably rigid or stiff material that enables securement by the attachment mechanism selected. In the illustrated embodiment, screws 145 are used whereupon the base member is preferably made of metal or rigid plastic including threaded holes for receiving the screws.

The friction material 148 preferably is bonded and/or mechanically locked to the finger 141. In the illustrated embodiment, the friction material, in this case silicone rubber, is molded to the base 147 which has a T-shape locking rib 149 around which the friction material is molded to lock the friction material to the base.

Figure 11:
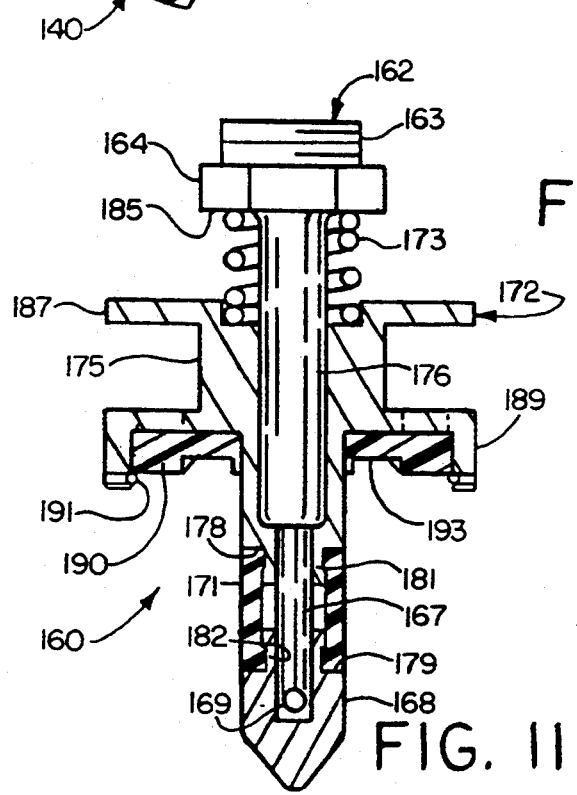
FIGS. 11 and 12 are sectional views of another holding device according to the invention, respectively showing collapsed and expanded positions of the device.
Figure 12:
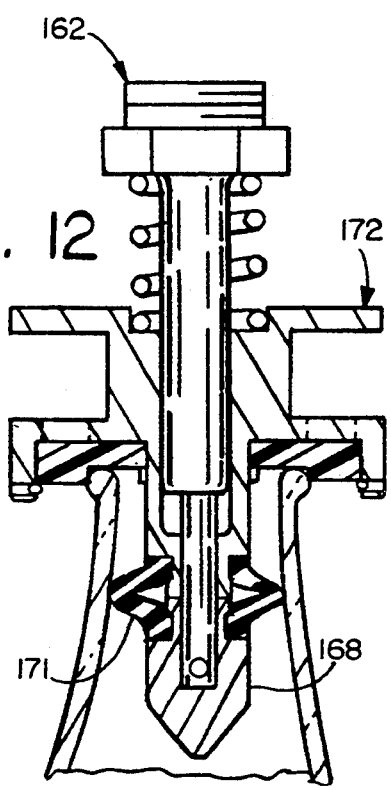

Referring now to FIGS. 11 and 12, another embodiment of chuck or gripper assembly is shown generally at 160. The gripper assembly 160 is similar in operative concept to a bottle stopper, although not used to plug a bottle but rather to engage and hold a bottle or other article.

The gripper assembly 160 comprises a support pin 162 that has an externally threaded upper end portion 163 for screwing into the internally threaded lower end portion of the spindle 46 shown in FIG. 1. The support pin also preferably has a wrench head portion 164 for engagement by a wrench or other suitable tool that may be used to turn the support pin for tightening purposes. In this manner, the gripper assembly may be removably attached to the spindle 46 in the same manner described above for the finger chuck assembly. Of course, other suitable means may be employed to removably secure the gripper assembly to the spindle 46 or, more generally, to the attachment pin 45 and/or conveyor chain 22.

At its lower end the support pin 162 has a reduced diameter intermediate link portion 167 to which a nose end member 168 is secured to form a part of the support pin. The nose end member 168 has a cylindrical upper portion and a conical lower portion, the latter providing for guided entry of the nose piece into the open end of a bottle or other article. The nose end member may be secured to the link portion 167 by a roll pin 169 after a gripping sleeve 171, operator member 172 and spring 173 have been telescoped over the support pin as shown.

The operator member 172 has a central hub portion 175 slidably disposed on the shank portion 176 of the support pin 162 for relative axial movement. The operator member 172 and nose end member 168 have axially spaced apart surfaces 178 and 179 respectively for engaging opposite axial ends of the sleeve 171 and which are movable towards one another to cause the sleeve to bellow out for engaging an interior surface of a bottle or other article as shown in FIG. 12. Preferably, the ends of the sleeve are telescopically fitted over short posts 1 81 and 182 projecting from the opposed surfaces 178 and 179 that are oriented transversely to the axis of the support pin. The short posts prevent lateral shifting of the ends of the sleeve during expansion and contraction of the sleeve. The short posts also serve as abutments that limit the extent to which the axially spaced apart surfaces can be moved together. The short posts also may be provided with radially projecting ribs as shown, or barbs or the like, that aid in pulling the sleeve to its elongated condition shown in FIG. 11.

The spring 173 is interposed between the upper end of the operator member 172 and the shoulder 185 formed at the underside of the wrenching portion 164 of the support pin 162. Accordingly, the operator member is biased toward its position causing radial expansion of the sleeve 171 as shown in FIG. 12. To allow a bottle or other article to be loaded onto the gripper assembly, the operator member is moved against the biasing force of the spring and away from the nose member of the support pin. This will radially collapse the sleeve to a generally cylindrical shape as shown in FIG. 11.

The operator member 172 may be moved axially relative to the support pin 162 by means of a cam that engages a cam follower surface of the operator member as the gripper assembly is moved laterally along the path of the conveyor to which it is attached. In the illustrated embodiment, the operator member has a flange or pusher plate 187 that may be engaged at the bottom surface thereof by a cam or cams disposed in its path that force the operator away from the nose end member 168. When the sleeve 171 has been sufficiently collapsed or contracted to fit into a neck opening of the bottle or other article to be held by the finger chuck assembly, the open neck of the article may be telescoped over the contracted gripping sleeve. With the bottle telescoped over the contracted sleeve, the operator member 172 then is allowed to move towards the nose member to expand the gripping sleeve for gripping the interior surface of the bottle.

Preferably, the open end of the bottle is positioned such that the bottom of the operator member 172 will move to engagement therewith as shown in FIG. 12. Preferably, the lower end of the operator member is configured like the cap of the above described finger chuck assembly for similar reasons. Accordingly, there is provided a receptacle 189 for an insert 190 which is held in place by a split ring 191 or other suitable retaining means or device. The insert 190 may be provided with a central hole or recess forming a socket 193 for closely receiving the upper end of the bottle thereby to prevent lateral shifting movement of the upper end of the bottle when engaged and held to the cap by the radially outwardly expanded sleeve.

Figure 13:
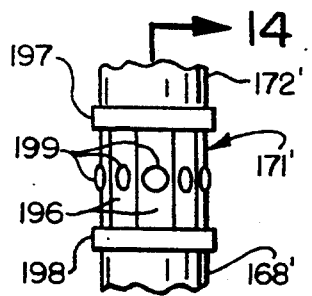
FIG. 13 is a fragmentary elevational view illustrating another form of flexible sleeve that may be used in the holding device of FIGS. 11 and 12.
Figure 14:
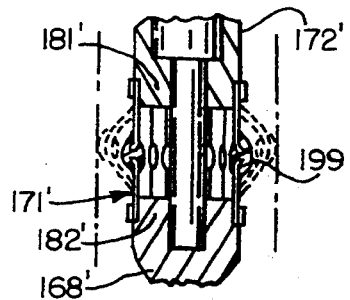
FIG. 14 is a fragmentary sectional view taken along the line 14—14 of FIG. 13.

The flexible sleeve 171 may be in the form of an elastomeric tubular sleeve as shown in FIGS. 11 and 12, with the sleeve being made, for example, of silicone rubber. The flexible sleeve alternatively may be composed of a tubular array of flexible metal strap elements, the latter preferably having friction material at intermediate portions thereof for positive gripping of the hollow article. As shown in FIGS. 13 and 14, the elastomeric sleeve 171 of FIGS. 11 and 12 may be replaced by a flexible metal sleeve 171' composed of a circumferential arrangement of metal straps 196 secured at their upper ends by clamp band 197 to post 181' of the operator member 172' and at their lower ends by clamp band 198 to post 182' of the nose end member 168'. Centrally between the ends of each strap 196 there is provided a button 199 of friction material such as silicone rubber. Preferably the button is molded to the strap at a hole therein such that material extrudes through the hole and forms enlarged portions at opposite sides of the strap thereby to mechanically lock the button to the strap. The straps may also be permanently deformed intermediate their length to give same a set that will insure that the straps bellow radially outwardly as shown in broken lines in FIG. 14 when the operator member 172' moves toward the nose end member 168' in the manner described above in connection with FIGS. 11 and 12. Although the straps are shown contiguous in FIGS. 13 and 14, they may be circumferentially spaced apart if desired, with the result being a flexible sleeve that is circumferentially discontinuous. Also, the buttons 199 may be replaced by a band or sleeve of friction material circumscribing the straps, which band or sleeve may be separated between the straps.

Although the invention has been shown and described with respect to certain preferred embodiments, equivalent alterations and modifications will no doubt occur to others skilled in the art upon the reading and understanding of this specification. Moreover, while a particular feature of the invention may be described with respect to only one of the illustrated embodiments, such feature may be combined with one or more features of the other embodiment as may be desired and advantageous for any given or particular application. The present invention includes all such equivalent alterations and modifications, and is limited only by the scope of the following claims.

What is claimed is:

1. A finger chuck assembly for holding a hollow article having a neck opening at one end, comprising
a support member having an axis;
a plurality of jaws each including a gripping finger, an actuator arm and an intermediate portion interconnecting the gripping finger and actuator arm, the jaws each being mounted at the intermediate portion to the support member for pivotal movement of the gripping finger thereof between a contracted position for insertion into a neck opening of a hollow article and an expanded position for engagement with an interior surface of the hollow article, the gripping fingers of the jaws extending generally parallel to one another and to the axis of the support member when in their contracted positions and diverging laterally outwardly away from one another when in their expanded positions; and
a chuck operator member carried on the support member for movement relative to the support member, the chuck operator member operatively engaging the actuator arms of the jaws for effecting movement of the jaws and corresponding movement of the gripping fingers between their expanded and contracted positions in response to movement of the chuck operator member relative to the support member, and wherein each jaw has associated therewith a respective resilient element which operates to bias the gripping finger toward its expanded position.

2. A finger chuck assembly as set forth in claim 1, wherein the jaws each is generally L-shape with the finger and actuator arm forming respective legs of the L.

3. A finger chuck assembly as set forth in claim 2, wherein the chuck operator member includes a pusher plate mounted on the support member for relative movement parallel to the axis of the support member, the pusher plate having a pusher surface for engaging the actuator arms of the jaws, and the actuator arms each having a bearing surface spaced from a pivot axis of the corresponding jaw slidably engaging the pusher surface.

4. A finger chuck assembly as set forth in claim 1, wherein the gripping fingers have on laterally outer sides thereof friction material for contacting the interior surface of the hollow article.

5. A finger chuck assembly as set forth in claim 4, wherein the friction material is bonded to the gripping fingers.

6. A finger chuck assembly as set forth in claim 4, wherein the friction material is mechanically locked to the gripping fingers.

7. A finger chuck assembly as set forth in claim 4, wherein the friction material is molded to the gripping fingers.

8. A finger chuck assembly as set forth in claim 4, wherein the friction material on each gripping finger is fixed to a base, and the base is removably attached to the gripping finger.

9. A finger chuck assembly as set forth in claim 1, wherein the support member has a mounting end and a jaw end, and the jaws are connected by pivot pins to the jaw end of the support member.

10. A finger chuck assembly as set forth in claim 1, wherein the plurality of jaws includes three jaws circumferentially equally spaced around the axis.

11. A finger chuck assembly as set forth in claim 1, wherein the support member includes a pin having a head portion and a shank portion, and wherein the intermediate portions of the jaws are pivotally connected to the head portion.

12. A finger chuck assembly as set forth in claim 1, wherein the support member includes a cap from which the gripping fingers of the jaws project, the cap being disposed for engagement by the open neck end of the hollow article thereby to limit the extent of insertion of the gripping fingers into the hollow article.

13. A finger chuck assembly as set forth in claim 12, wherein the cap includes means cooperative with the jaws for laterally stabilizing the hollow article when the hollow article is internally engaged by the gripping fingers of the jaws.

14. A finger chuck assembly as set forth in claim 13, wherein the means for laterally stabilizing includes a planar abutment surface for engaging the open neck end of the hollow article.

15. A finger chuck assembly as set forth in claim 13, wherein the means for laterally stabilizing includes a socket in the cap for receiving the open neck end of the hollow article with a close lateral fit.

16. A finger chuck assembly as set forth in claim 1, wherein the jaws have guide ramp surfaces at distal ends thereof for guiding the distal ends thereof into the neck opening of the hollow article.

17. A finger chuck assembly as set forth in claim 16, wherein the guide ramp surfaces at the distal ends of the fingers collectively form a conical guide surface when the jaws are in the contracted positions.

18. A finger chuck assembly as set forth in claim 17, wherein the jaws have recesses at their radially outer sides, and friction material is fixed within the recesses for engaging an interior surface of the hollow article.

19. A finger chuck assembly for holding a hollow article having a neck opening at one end, comprising a support member having an axis;

a plurality of jaws each including a gripping finger, an actuator arm and an intermediate portion interconnecting the gripping finger and actuator arm, the jaws each being mounted at the intermediate portion to the support member for pivotal movement of the gripping finger thereof between a contracted position for insertion into a neck opening of a hollow article and an expanded position for engagement with an interior surface of the hollow article, the gripping fingers of the jaws extending generally parallel to one another and to the axis of the support member when in their contracted positions and diverging laterally outwardly away from one another when in their expanded positions; and a chuck operator member carried on the support member for movement relative to the support member, the chuck operator member operatively engaging the actuator arms of the jaws for effecting movement of the jaws and corresponding movement of the gripping fingers between their expanded and contracted positions in response to movement of the chuck operator member relative to the support member, and wherein the jaws each is generally L-shape with the finger and actuator arm forming respective legs of the L, and wherein the chuck operator member includes a pusher plate mounted on the support member for relative movement parallel to the axis of the support member, the pusher plate having a pusher surface for engaging the actuator arms of the jaws, and the actuator arms each having a bearing surface spaced from a pivot axis of the corresponding jaw slidably engaging the pusher surface, and wherein the chuck operator member includes bias means for causing the actuator arms of the jaws to be biased against the pusher surface of the pusher plate.

20. A finger chuck assembly as set forth in claim 19, wherein the support member includes a cap from which the gripping fingers of the jaws project, the cap being disposed for engagement by the open neck end of the hollow article thereby to limit the extent of insertion of the gripping fingers into the hollow article, and the bias means includes springs interposed between the cap and actuator arms of the jaws.

21. A finger chuck assembly as set forth in claim 20, wherein the springs are compressible to permit ready removal thereof from between the cap and actuator arms for interchange with springs having different spring constants.

22. A finger chuck assembly as set forth in claim 19, including a stop for limiting movement of the pusher plate in a first direction, and wherein the bias means is operative to cause the actuator arms to bias the pusher plate against the stop.

23. A finger chuck assembly as set forth in claim 22, wherein the stop is fixed with respect to the support member.

24. A finger chuck assembly for holding a hollow article having a neck opening at one end, comprising a support member having an axis;

a plurality of jaws each including a gripping finger, an actuator arm and an intermediate portion interconnecting the gripping finger and actuator arm, the jaws each being mounted at the intermediate portion to the support member for pivotal movement of the gripping finger thereof between a contracted position for insertion into a neck opening of a hollow article and an expanded position for engagement with an interior surface of the hollow article, the gripping fingers of the jaws extending generally parallel to one another and to the axis of the support member when in their contracted positions and diverging laterally outwardly away from one another when in their expanded positions; and a chuck operator member carried on the support member for movement relative to the support member, the chuck operator member operatively engaging the actuator arms of the jaws for effecting movement of the jaws and corresponding movement of the gripping fingers between their expanded and contracted positions in response to movement of the chuck operator member relative to the support member, and wherein the support member includes a cap from which the gripping fingers of the jaws project, the cap being disposed for engagement by the open neck end of the hollow article thereby to limit the extent of insertion of the gripping fingers into the hollow article, wherein the cap includes means cooperative with the jaws for laterally stabilizing the hollow article when the hollow article is internally engaged by the gripping fingers of the jaws, wherein the means for laterally stabilizing includes a planar abutment surface for engaging the open neck end of the hollow article, and wherein the cap includes a receptacle and a replaceable insert housed in the receptacle, and the replaceable insert includes the means for laterally stabilizing, whereby the replaceable insert may be replaced by other inserts for hollow articles having different neck end configurations.

25. A method for processing a hollow article comprising the steps of engaging and holding the hollow article to a conveyor at a loading station, moving the conveyor for transfer of the article held thereto through at least one processing station, and removing the article from the conveyor at an unloading station after passage of the article through said at least one processing station, and wherein said conveyor has operatively associated therewith at least one finger chuck assembly comprising a support member having an axis; a plurality of jaws each including a gripping finger, an actuator arm and an intermediate portion interconnecting the gripping finger and actuator arm, the jaws each being mounted at the intermediate portion to the support member for pivotal movement of the gripping finger thereof between a contracted position for insertion into a neck opening of a hollow article and an expanded position for engagement with an interior surface of the hollow article, the gripping fingers of the jaws extending generally parallel to one another and to the axis of the support member when in their contracted positions and diverging laterally outwardly away from one another when in their expanded positions; and a chuck operator member carried on the support member for movement relative to the support member; and said engaging and holding step including the step of moving the chuck operator member relative to the support member to effect movement of the jaws through engagement therewith and corresponding movement of the gripping fingers from their contracted to their expanded positions for engagement with the interior surface of the hollow article, such movement of the jaws being under the action of respective resilient elements operative to bias the gripping fingers toward their expanded positions.

* * * * *